US007209186B2

(12) United States Patent
Izawa

(10) Patent No.: US 7,209,186 B2
(45) Date of Patent: Apr. 24, 2007

(54) IMAGE PROCESSING APPARATUS AND IMAGE PROCESSING METHOD FOR HIGH SPEED REAL-TIME PROCESSING

(75) Inventor: Takashi Izawa, Tokyo (JP)

(73) Assignee: Sony Corporation, Tokyo (JP)

( * ) Notice: Subject to any disclaimer, the term of this patent is extended or adjusted under 35 U.S.C. 154(b) by 597 days.

(21) Appl. No.: 10/411,005

(22) Filed: Apr. 10, 2003

(65) Prior Publication Data
US 2003/0223016 A1 Dec. 4, 2003

(30) Foreign Application Priority Data
Apr. 12, 2002 (JP) .............................. 2002-109933

(51) Int. Cl.
H04N 7/01 (2006.01)
G06F 12/00 (2006.01)
(52) U.S. Cl. ...................... 348/714; 348/441; 711/158; 711/167; 725/101
(58) Field of Classification Search ................ 348/441, 348/714, 718, 719, 581; 345/505, 531, 533–535, 345/660, 666, 520, 541, 542, 554; 365/230.05, 365/189.02, 221, 189.04, 230.02; 358/1.2, 358/451; 710/58; 711/100, 154, 158, 167–169; 713/400; 725/87, 93, 92, 94, 101, 103
See application file for complete search history.

(56) References Cited

U.S. PATENT DOCUMENTS 4,700,330 A * 10/1987 Altman et al. .............. 365/222
5,052,046 A * 9/1991 Fukuda et al. .............. 382/308
5,056,041 A * 10/1991 Guttag et al. ............... 345/563
5,163,123 A * 11/1992 Kadono ...................... 358/1.17
5,612,790 A * 3/1997 Sakamoto et al. ............ 386/69
5,706,482 A * 1/1998 Matsushima et al. ....... 345/535
5,793,971 A * 8/1998 Fujita et al. ................ 725/101
5,809,278 A * 9/1998 Watanabe et al. ........... 711/150
5,845,314 A * 12/1998 Ishida ........................ 711/104
6,118,724 A 9/2000 Higginbottom
6,266,718 B1 7/2001 Klein
6,389,520 B2 * 5/2002 Christenson ................ 711/157
6,775,716 B2 * 8/2004 Tojima et al. ................ 710/22
6,789,174 B2 * 9/2004 Konishi et al. .............. 711/150
2003/0137519 A1 * 7/2003 Nazanda et al. ............ 345/531

* cited by examiner

Primary Examiner—Victor R. Kostak
(74) Attorney, Agent, or Firm—Frommer Lawrence & Haug LLP; William S. Frommer; Thomas F. Presson

(57) ABSTRACT

The present invention provides an image processing apparatus and an image processing method. The image processing apparatus includes: a first to a fourth writing FIFO unit and a first to a fourth reading FIFO unit (hereinafter referred to as "FIFO units") for temporarily retaining image data to write to and read from a data retaining memory; a memory access control unit for performing access to the data retaining memory, the access being requested by the FIFO units; and a writing data control unit for shifting, at all times by a predetermined time, timing of the request made by at least one of the FIFO units to the memory access control unit in comparison with timing of the request made by the other FIFO units to the memory access control unit.

8 Claims, 16 Drawing Sheets

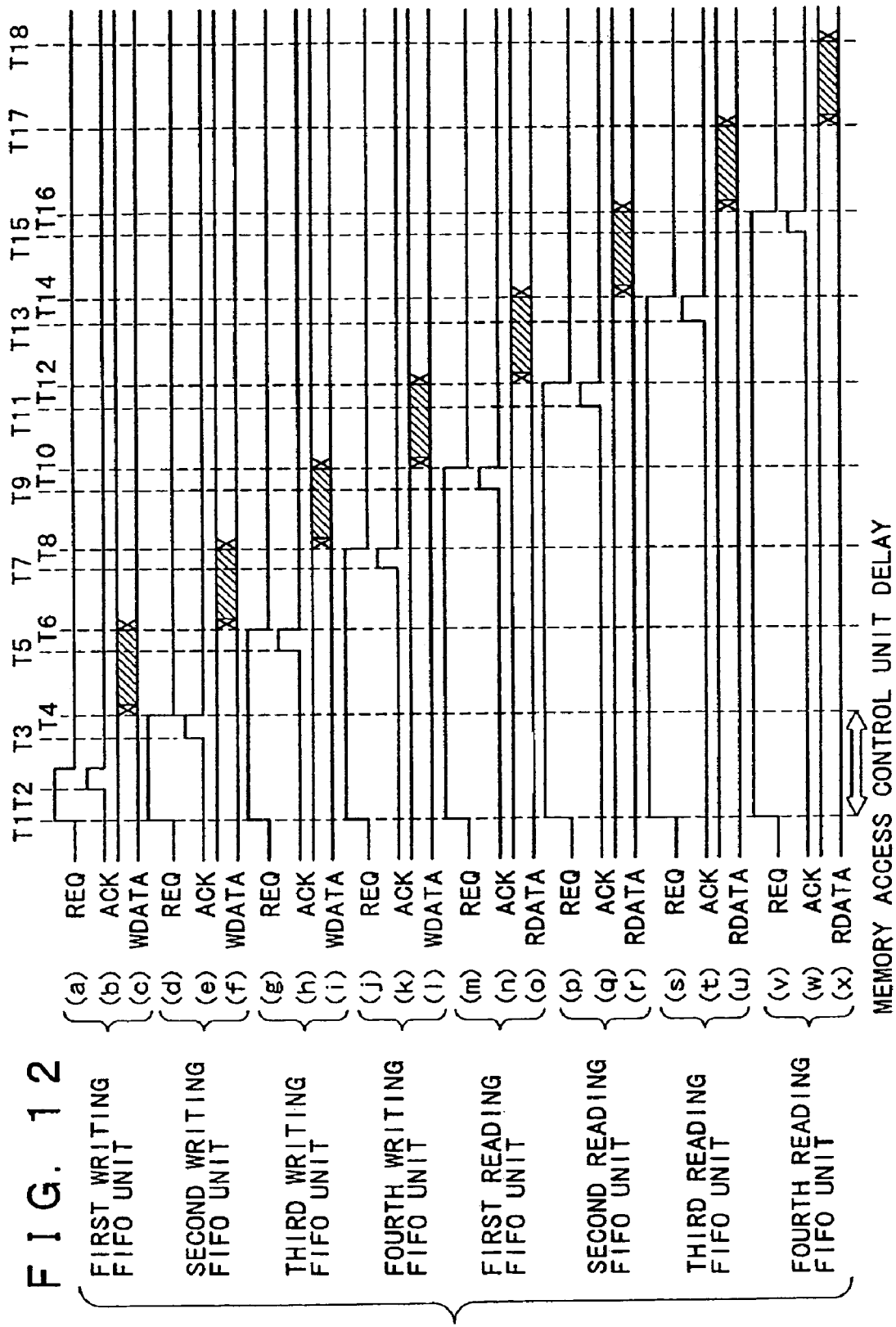

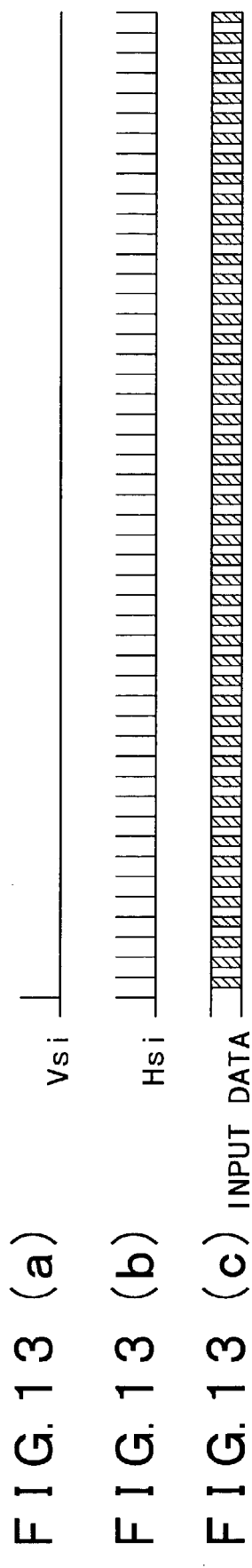
FIG. 13(a) Vsi
FIG. 13(b) Hsi
FIG. 13(c) INPUT DATA

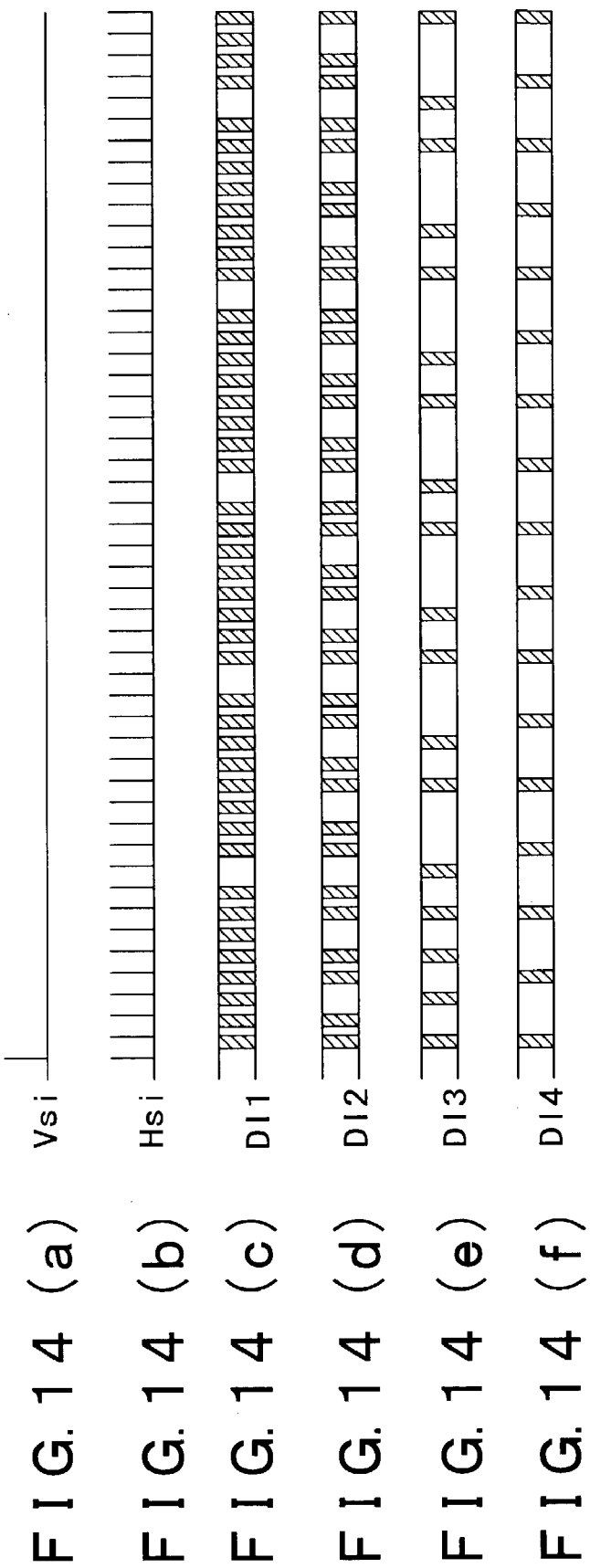

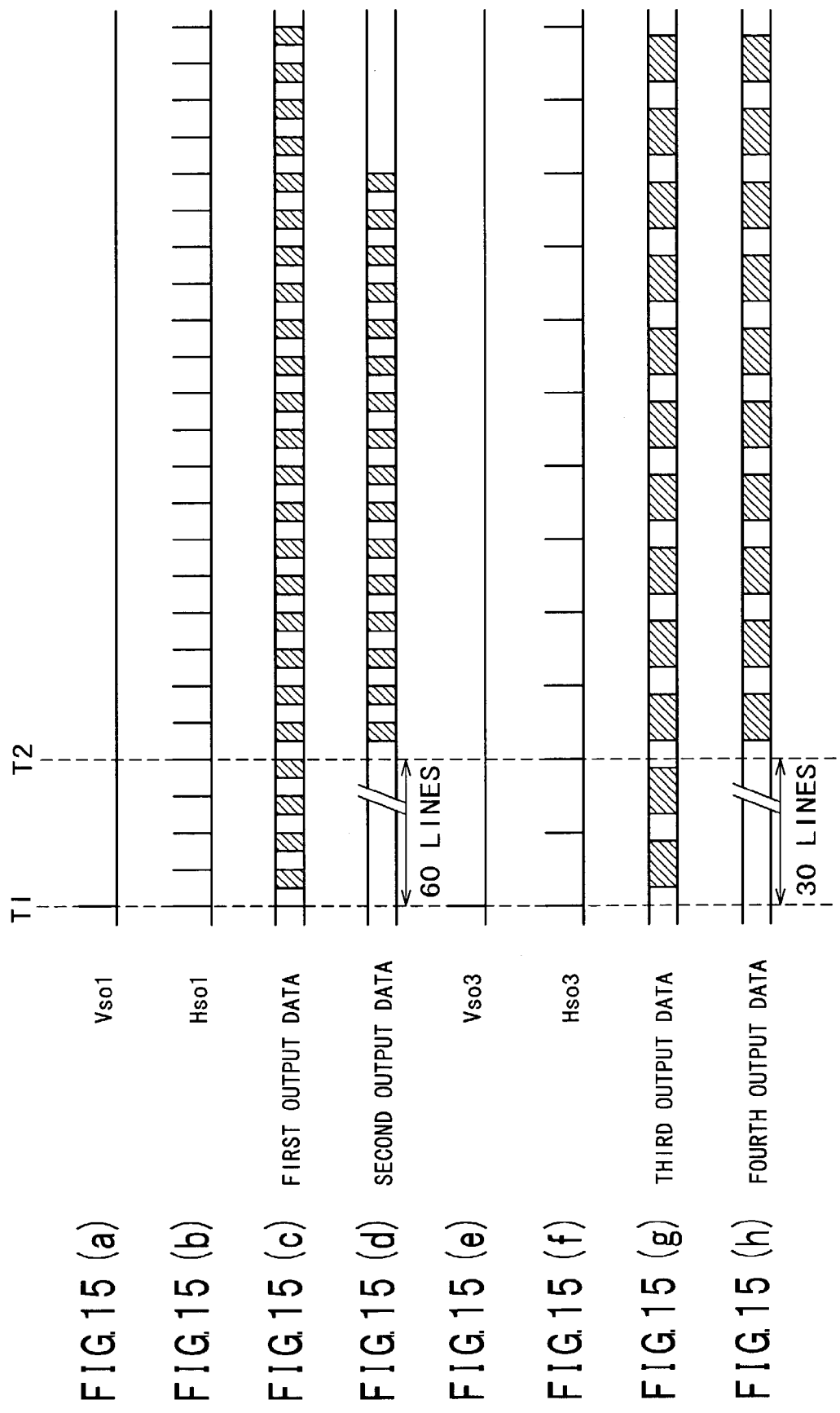

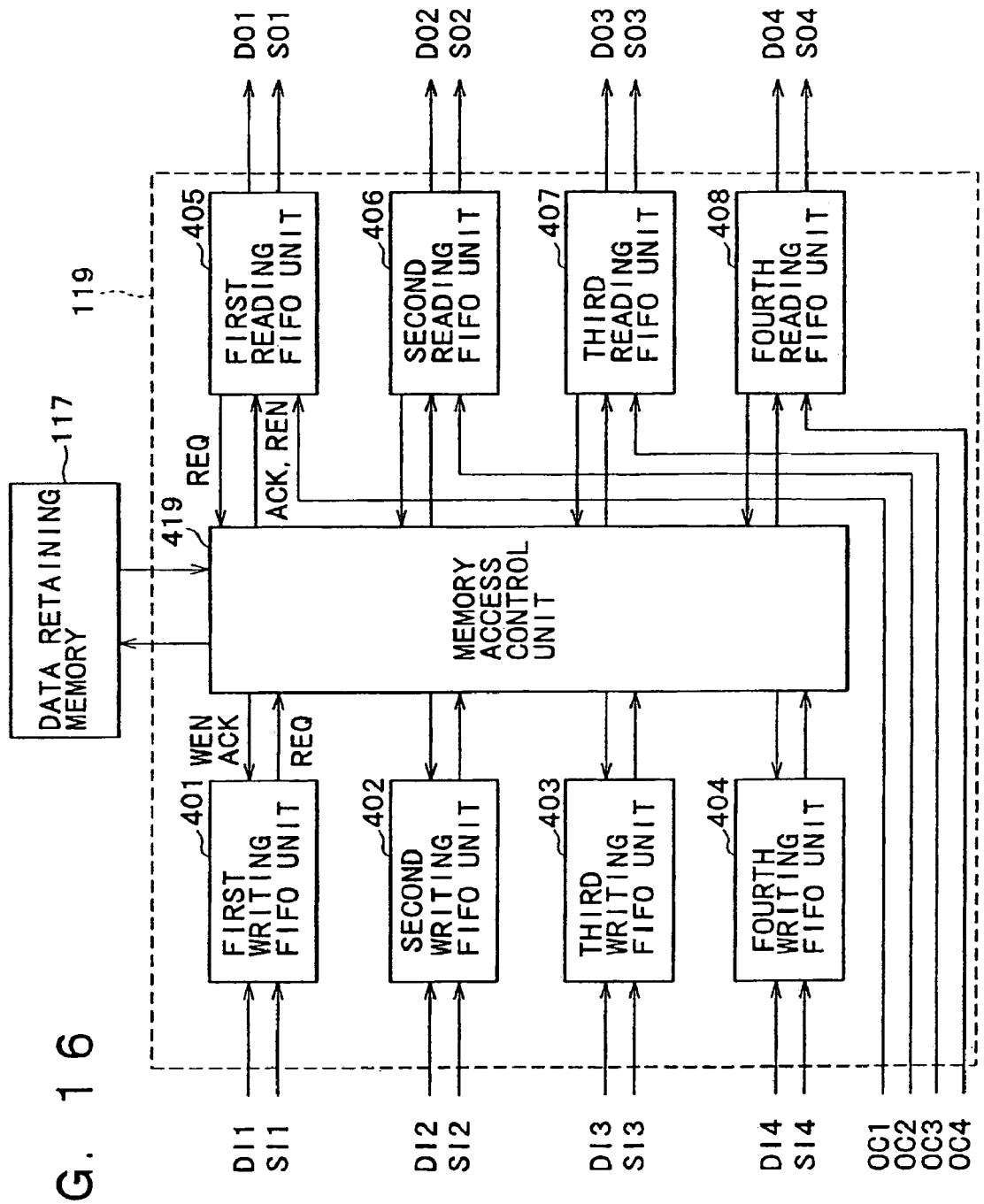

IMAGE PROCESSING APPARATUS AND IMAGE PROCESSING METHOD FOR HIGH SPEED REAL-TIME PROCESSING

BACKGROUND OF THE INVENTION

The present invention relates to an image processing apparatus and an image processing method.

In a field of image processing, real-time conversion of an image format is often required. Hardware is used in the real-time conversion of an image format; recently, however, format conversion by software executed by a CPU has been proposed.

There are now many applications requiring one piece of input image data to be simultaneously converted to a plurality of formats in real time for output. A video camera, for example, outputs one piece of image data obtained by photographing by the camera to multiple video media having different formats, such as a viewfinder, a recording tape, a liquid crystal panel, a television and the like.

Furthermore, many of recently spread digital televisions and liquid crystal panels have various formats, while the number of pixels of a CCD, which forms the camera, has been increased. Thus the entire system has become complicated.

In constructing such a system, a type, operation, and the like of a memory for retaining data are selected to be different for different systems. In addition, image formats have been diversified. Hence, not only a conventional memory access control unit but also an entire system including the memory access control unit has become very complicated in configuration.

Further, as described above, in order to realize control appropriate to the system, system design is required for each such system.

FIG. 16 is a block diagram showing a configuration of a memory control unit 119 in a conventional image processing apparatus. As shown in FIG. 16, the conventional memory control unit 119 includes: a first writing FIFO unit 401; a second writing FIFO unit 402; a third writing FIFO unit 403; a fourth writing FIFO unit 404; a first reading FIFO unit 405; a second reading FIFO unit 406; a third reading FIFO unit 407; a fourth reading FIFO unit 408; and a memory access control unit 419.

The first to fourth writing FIFO units 401 to 404, the first to fourth reading FIFO units 405 to 408, and a data retaining memory 117 are each connected to the memory access control unit 419. The first writing FIFO unit 401 is supplied with data DI1 and a synchronizing signal SI1. The second writing FIFO unit 402 is supplied with data DI2 and a synchronizing signal SI2. The third writing FIFO unit 403 is supplied with data DI3 and a synchronizing signal SI3. The fourth writing FIFO unit 404 is supplied with data DI4 and a synchronizing signal SI4.

The first reading FIFO unit 405 outputs data DO1 and a synchronizing signal SO1. The second reading FIFO unit 406 outputs data DO2 and a synchronizing signal SO2. The third reading FIFO unit 407 outputs data DO3 and a synchronizing signal SO3. The fourth reading FIFO unit 408 outputs data DO4 and a synchronizing signal SO4.

In the conventional memory control unit 119 as described above, the data DI1 to DI4 for different systems is written to the first to fourth writing FIFO units 401 to 404, respectively. The memory access control unit 419 temporarily stores the data in the data retaining memory 117. The first to fourth reading FIFO units 405 to 408 output the data stored in the data retaining memory 117 in response to synchronizing signals OC1 to OC4 supplied thereto, respectively.

An application that converts the format of image data and has a plurality of input and output systems as described above generally requires that one memory be accessible from a plurality of circuits for effective utilization of the memory.

In this case, in order to perform the access in real time, one method is conceivable in which a large FIFO memory is provided in a stage preceding the memory access control unit 419. However, this method increases development cost.

Further, when a method of controlling such access is to be devised, design, specification change and the like become difficult.

SUMMARY OF THE INVENTION

The present invention has been made to solve the above problems, and it is accordingly an object of the present invention to provide an image processing apparatus and an image processing method that realize high-speed, real-time processing with a simple configuration.

The object of the present invention is achieved by providing an image processing apparatus including: storing means for storing image data supplied thereto; a plurality of data retaining means for temporarily retaining the image data to write to and read from the storing means; memory access means for performing access to the storing means, the access being requested by the plurality of data retaining means; and access timing control means for shifting, at all times by a predetermined time, timing of the request made by at least one of the data retaining means to the memory access means in comparison with timing of the request made by the other data retaining means to the memory access means.

With such means, it is possible to reduce processing waiting time of at least one of the data retaining means with a simple configuration, and it is also possible to reduce memory capacity required of the storing means.

Further, the object of the present invention is achieved by providing an image processing method using an image processing apparatus, the image processing apparatus including: storing means for storing image data supplied thereto; and a plurality of data retaining means for temporarily retaining the image data to write to and read from the storing means, the image processing method comprising a step for shifting, at all times by a predetermined time, timing of access by at least one data retaining means to the storing means in comparison with timing of access by other data retaining means to the storing means.

With such means, it is possible to readily reduce processing waiting time of at least one of the data retaining means, and it is also possible to reduce memory capacity required of the storing means, therefore reduce the scale and manufacturing cost of the apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 12 is a timing chart of operation of the conventional memory access control unit;

FIGS. 13(a), 13(b), and 13(c) are diagrams showing the synchronizing signal and input data inputted to the image processing apparatus shown in FIG. 1;

FIGS. 14(a), 14(b), 14(c), 14(d), 14(e), and 14(f) are diagrams showing the synchronizing signal and image data after line number conversion processing by the image processing apparatus shown in FIG. 1;

FIGS. 15(a), 15(b), 15(c), 15(d), 15(e), 15(f), 15(g), and 15(h) are diagrams showing synchronizing signals and output data outputted from the image processing apparatus shown in FIG. 1; and FIG. 16 is a block diagram showing a configuration of a memory control unit in a conventional image processing apparatus.

DETAILED DESCRIPTION OF THE PREFERRED EMBODIMENT

Figure 1:
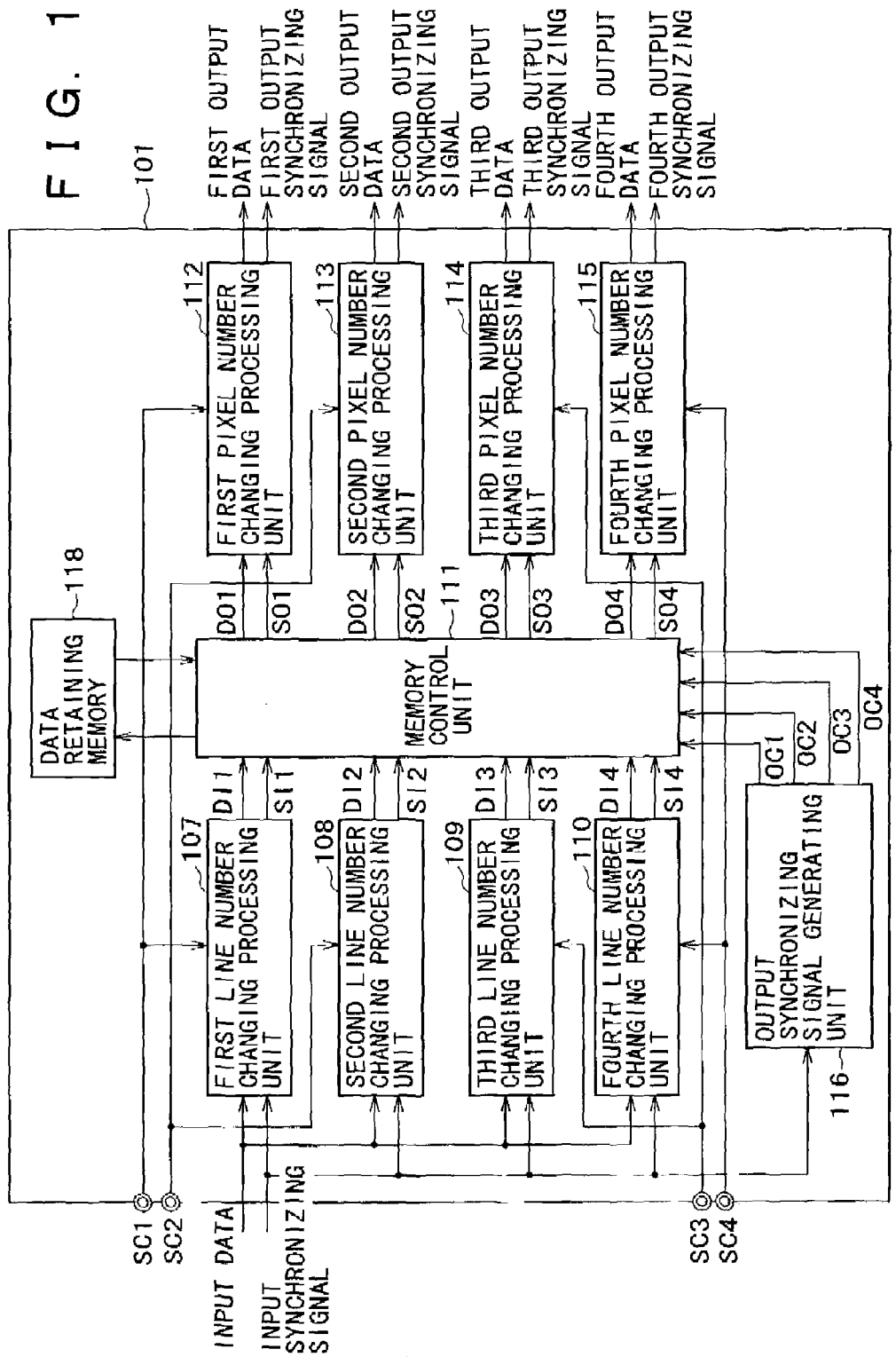
FIG. 1 is a block diagram showing a configuration of an image processing apparatus according to an embodiment of the present invention.

A preferred embodiment of the present invention will hereinafter be described in detail with reference to the drawings. In the drawings, the same reference numerals denote the same or corresponding parts.

FIG. 1 is a block diagram showing a configuration of an image processing apparatus 101 according to the embodiment of the present invention. As shown in FIG. 1, the image processing apparatus 101 according to the embodiment of the present invention comprises: a first to a fourth line number changing processing unit 107 to 110; a memory control unit 111; a first to a fourth pixel number changing processing unit 112 to 115; an output synchronizing signal generating unit 116; and a data retaining memory 118.

The first to fourth line number changing processing units 107 to 110, the first to fourth pixel number changing processing units 112 to 115, and the data retaining memory 118 are each connected to the memory control unit 111.

The first to fourth line number changing processing units 107 to 110 are supplied with input data, and the first to fourth line number changing processing units 107 to 110 and the output synchronizing signal generating unit 116 are supplied with an input synchronizing signal.

Further, the first line number changing processing unit 107 and the first pixel number changing processing unit 112 are externally supplied with a control signal SC1, and the second line number changing processing unit 108 and the second pixel number changing processing unit 113 are externally supplied with a control signal SC2. Also, the third line number changing processing unit 109 and the third pixel number changing processing unit 114 are externally supplied with a control signal SC3, and the fourth line number changing processing unit 110 and the fourth pixel number changing processing unit 115 are externally supplied with a control signal SC4. By changing the control signals SC1 to SC4, it is possible to change modes in arbitrary timing even during operation of the image processing apparatus 101.

The first pixel number changing processing unit 112 outputs first output data and a first output synchronizing signal, and the second pixel number changing processing unit 113 outputs second output data and a second output synchronizing signal. Similarly, the third pixel number changing processing unit 114 outputs third output data and a third output synchronizing signal, and the fourth pixel number changing processing unit 115 outputs fourth output data and a fourth output synchronizing signal. It is to be noted that while the image processing apparatus 101 shown in FIG. 1 has one input system and four output systems as described above, an image processing apparatus 101 having a plurality of input systems, or five output systems or more can be considered in a similar manner.

Real-time processing of the image processing apparatus 101 having the configuration as described above will next be briefly described. First, in order to convert the input data to four different formats, the first to fourth line number changing processing units 107 to 110 change the number of lines with different change ratios. Data DI1 to DI4 generated by the first to fourth line number changing processing units 107 to 110 is supplied to the memory control unit 111.

In the meantime, the output synchronizing signal generating unit 116 generates synchronizing signals OC1 to OC4 in response to the input synchronizing signal supplied thereto, and then supplies the synchronizing signals OC1 to OC4 to the memory control unit 111.

The memory control unit 111 makes the data retaining memory 118 temporarily retain the data DI1 to DI4 supplied from the first to fourth line number changing processing units 107 to 110. Also, the memory control unit 111 supplies image data retained in the data retaining memory 118 to the first to fourth pixel number changing processing units 112 to 115 in the different systems in response to the supplied synchronizing signals OC1 to OC4.

The first to fourth pixel number changing processing units 112 to 115 are paired with the first to fourth line number changing processing units 107 to 110, respectively, to perform image processing in the different systems. Specifically, the first to fourth pixel number changing processing units 112 to 115 perform interpolating calculation to convert data DO1 to DO4 supplied thereto to numbers of pixels conforming to the formats of the respective systems, and then output the resulting first to fourth output data in conjunction with the first to fourth output synchronizing signals, respectively.

Figure 2:
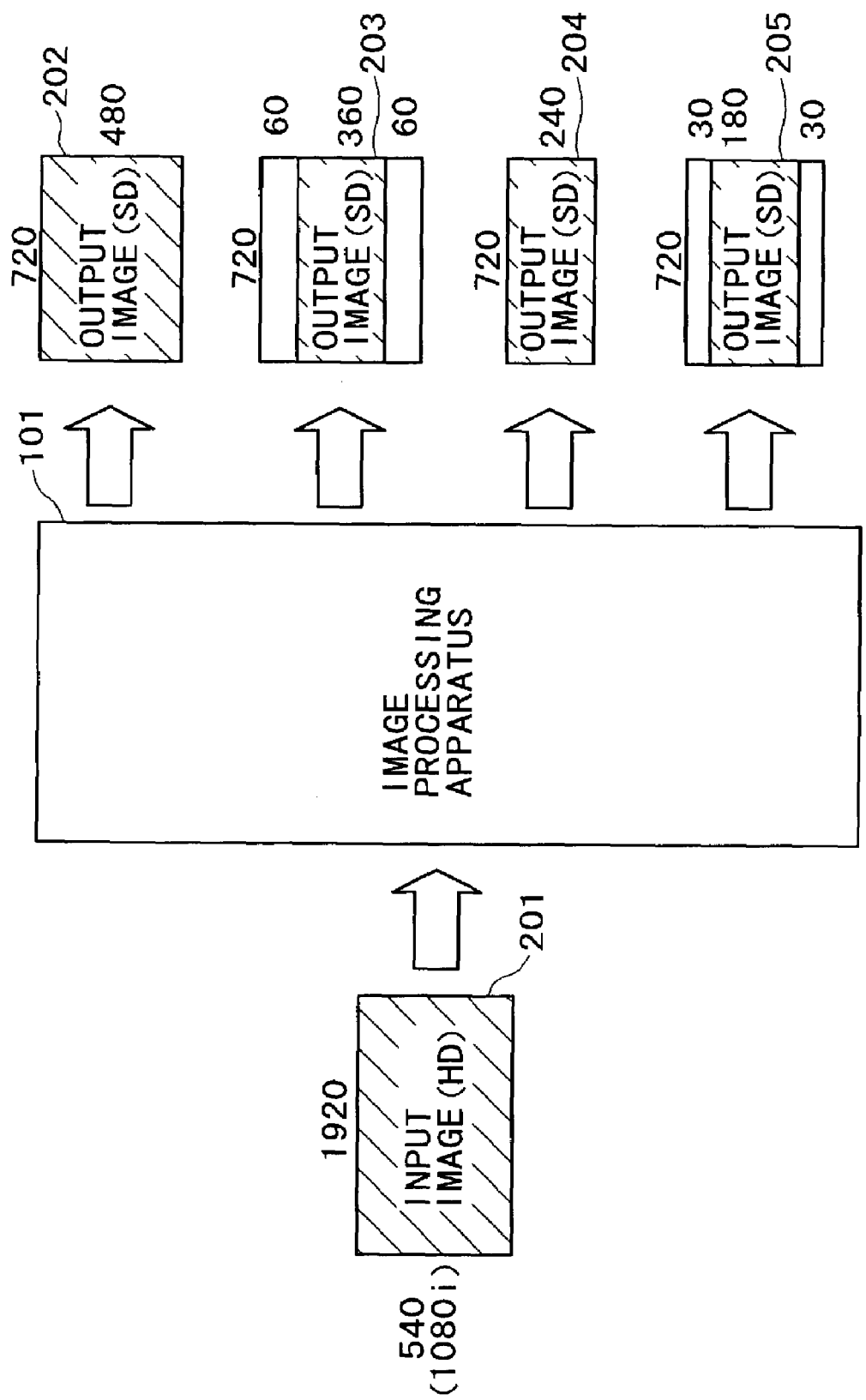
FIG. 2 is a diagram of assistance in explaining operation of the image processing apparatus shown in FIG. 1.

In the following, as shown in FIG. 2, description will be made specifically by taking as an example an operation for converting an input image 201 of 1920 pixels in a horizontal direction and 540 lines in a vertical direction (a mode of displaying 540 lines per field, with 1080 lines for one frame, which mode is represented by "1080i" (i denotes an interlace mode indicating alternate scanning)) to four formats, that is, into an output image 202 of 720 pixels×480 lines in a mode referred to as "480p" (p denotes a progressive mode indicating progressive scanning), an output image 203 of 720 pixels×360 lines in the same "480p" mode but having an effective image signal compressed to 360 lines to be used for a movie or the like, an output image 204 of 720 pixels×240 lines in a "480i" mode used for ordinary television, and an output image 205 of 720 pixels×180 lines in the "480i" mode but having an effective image of 180 lines at the center of a screen.

Incidentally, the size and format of the above input image is referred to as HD (High Definition), and the size and format of the above output images is referred to as SD (Standard Definition). The output images 203 and 205 each have black displayed at a top and a bottom thereof, and this display format is generally referred to as a letterbox. It is needless to say that the embodiment of the present invention is applied not only to a case where the images shown in FIG. 2 are inputted and outputted but also to a case where images having various formats are inputted and outputted.

Figure 3:
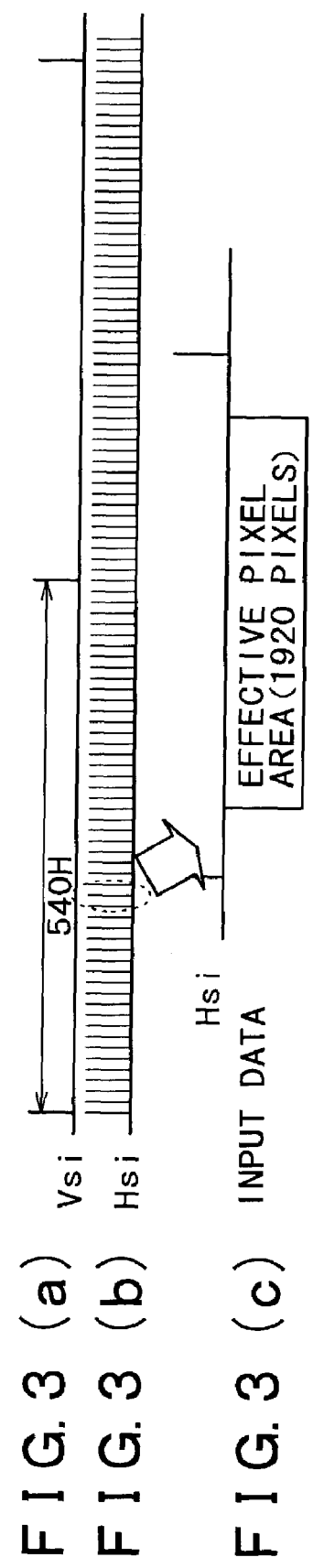
FIGS. 3(a), 3(b), and 3(c) are diagrams showing an input synchronizing signal and input data inputted to the image processing apparatus shown in FIG. 1.

FIGS. 3(a), 3(b), and 3(c) are diagrams showing the input synchronizing signal and the input data inputted to the image processing apparatus 101 in the above concrete example. FIG. 3(a) shows an input field synchronizing signal Vsi; FIG. 3(b) shows an input horizontal synchronizing signal Hsi; and FIG. 3(c) shows the input data.

The field synchronizing signal Vsi is a synchronizing signal generated for each field of an image. In the interlace mode, scanning lines are scanned alternately, and therefore two fields form one frame. On the other hand, the horizontal synchronizing signal Hsi is a synchronizing signal generated for each line of the image. One field period has horizontal scanning periods for 540 lines (540 Hs). An effective pixel area between horizontal synchronizing signals Hsi shown in FIG. 3C indicates an effective data period of the image. In this period, pieces of pixel data are arranged in order from the left. The input data in the above concrete example includes pixel data of 1920 pixels in an effective pixel area between contiguous horizontal synchronizing signals Hsi.

Figure 4:
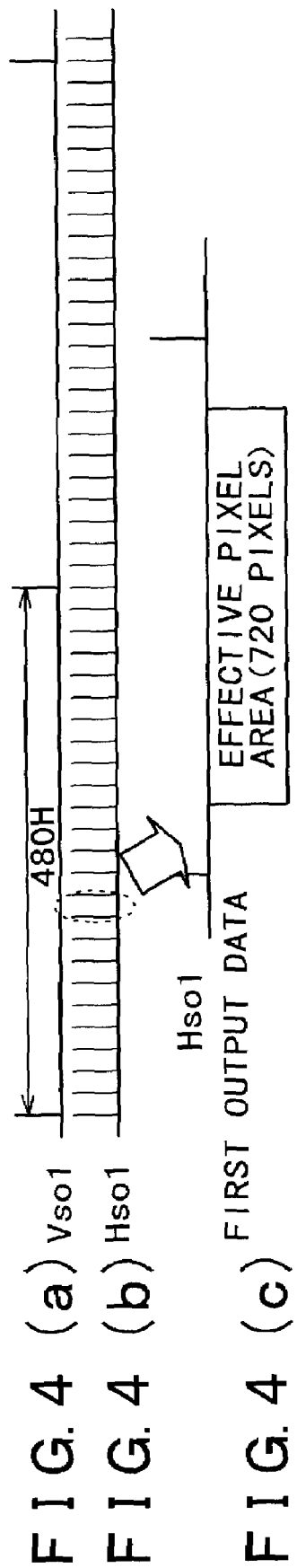
FIGS. 4(a), 4(b), and 4(c) are diagrams showing a first output synchronizing signal and first output data outputted from the image processing apparatus shown in FIG. 1.

FIGS. 4(a), 4(b), and 4(c) are diagrams showing the first output synchronizing signal and the first output data outputted from the image processing apparatus 101 in the above concrete example. FIG. 4(a) shows a field synchronizing signal Vso1 forming the first output synchronizing signal; FIG. 4(b) shows a horizontal synchronizing signal Hso1; and FIG. 4(c) shows the first output data.

The field synchronizing signal Vso1 is a synchronizing signal generated for each frame of an image. The horizontal synchronizing signal Hso1 is a synchronizing signal generated for each line of the image. An effective pixel area between horizontal synchronizing signals Hso1 shown in FIG. 4(c) indicates an effective data period of the image. In this period, pieces of pixel data are arranged in order from the left. The first output data in the above concrete example includes pixel data of 720 pixels in an effective pixel area between contiguous horizontal synchronizing signals Hso1.

The second output synchronizing signal and the second output data outputted from the image processing apparatus 101 are similar to the first output synchronizing signal and the first output data, respectively. However, the second output synchronizing signal and the second output data are different from the first output synchronizing signal and the first output data, respectively, in that while there are horizontal synchronizing signals Hso1 shown in FIG. 4(b) and effective pixel areas as shown in FIG. 4(c) for 480 lines (480 Hs) between contiguous field synchronizing signals Vso1, there are horizontal synchronizing signals Hso2 and effective pixel areas of the second output data for 360 lines between contiguous field synchronizing signals Vso2.

Figure 5:
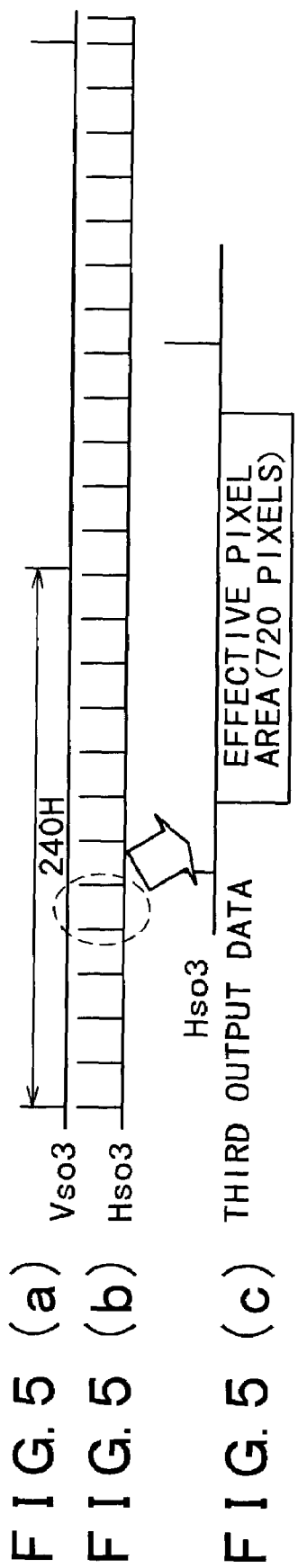
FIGS. 5(a), 5(b), and 5(c) are diagrams showing a third output synchronizing signal and third output data outputted from the image processing apparatus shown in FIG. 1.

FIGS. 5(a), 5(b), and 5(c) are diagrams showing the third output synchronizing signal and the third output data outputted from the image processing apparatus 101 in the above concrete example. FIG. 5(a) shows a field synchronizing signal Vso3 forming the third output synchronizing signal; FIG. 5(b) shows a horizontal synchronizing signal Hso3; and FIG. 5(c) shows the third output data.

The field synchronizing signal Vso3 is a synchronizing signal generated for each field of an image. The horizontal synchronizing signal Hso3 is a synchronizing signal generated for each line of the image. An effective pixel area between horizontal synchronizing signals Hso3 shown in FIG. 5(c) indicates an effective data period of the image. In this period, pieces of pixel data are arranged in order from the left. The third output data in the above concrete example includes pixel data of 720 pixels in an effective pixel area between contiguous horizontal synchronizing signals Hso3.

The fourth output synchronizing signal and the fourth output data outputted from the image processing apparatus 101 are similar to the third output synchronizing signal and the third output data, respectively. However, the fourth output synchronizing signal and the fourth output data are different from the third output synchronizing signal and the third output data, respectively, in that while there are horizontal synchronizing signals Hso3 shown in FIG. 5B and effective pixel areas as shown in FIG. 5(C) for 240 lines (240 Hs) between contiguous field synchronizing signals Vso3, there are horizontal synchronizing signals Hso4 and effective pixel areas of the fourth output data for 180 lines between contiguous field synchronizing signals Vso4.

The first to fourth line number changing processing units 107 to 110 shown in FIG. 1 change the number of lines of an image by subjecting the input data to interpolating calculation, and then supply the resulting data DI1 to DI4, respectively, to the memory control unit 111. In this case, any of linear interpolation, cubic interpolation and other methods may be used as a method of interpolation, and the method of interpolation may be implemented not only by hardware but also by software.

In the above concrete example, an HD image is converted into SD images. The first line number changing processing unit 107 converts the input data having data of 540 lines per field into an image of 480 lines per frame in response to the externally supplied control signal SC1. The second line number changing processing unit 108 converts the input data having the data of 540 lines per field into an image of 360 lines per frame in response to the externally supplied control signal SC2.

Similarly, the third line number changing processing unit 109 converts the input data having the data of 540 lines per field into an image of 240 lines per field in response to the externally supplied control signal SC3. The fourth line number changing processing unit 110 converts the input data having the data of 540 lines per field into an image of 180 lines per field in response to the externally supplied control signal SC4.

Incidentally, when at least two of the first to fourth line number changing processing units 107 to 110 generate image data of the same number of lines per frame or field, one such processing unit can be shared by a plurality of systems. When the number of systems is other than four, such processing units may be provided according to the number of systems.

Further, the first to fourth line number changing processing units 107 to 110 delay the supplied input synchronizing signal according to the conversion processing, and then supply synchronizing signals SI1 to SI4 respectively in conjunction with the image data to the memory control unit 111.

Next, the memory control unit 111 temporarily stores the data DI1 to DI4 supplied from the first to fourth line number changing processing units 107 to 110 in the data retaining memory 118. Also, the memory control unit 111 reads the data in predetermined timing in response to the supplied synchronizing signals OC1 to OC4, and outputs data DO1 to DO4 and synchronizing signals SO1 to SO4 to the first to fourth pixel number changing processing units 112 to 115, respectively. Such control in the memory control unit 111 may be performed by hardware or by software.

Figure 6:
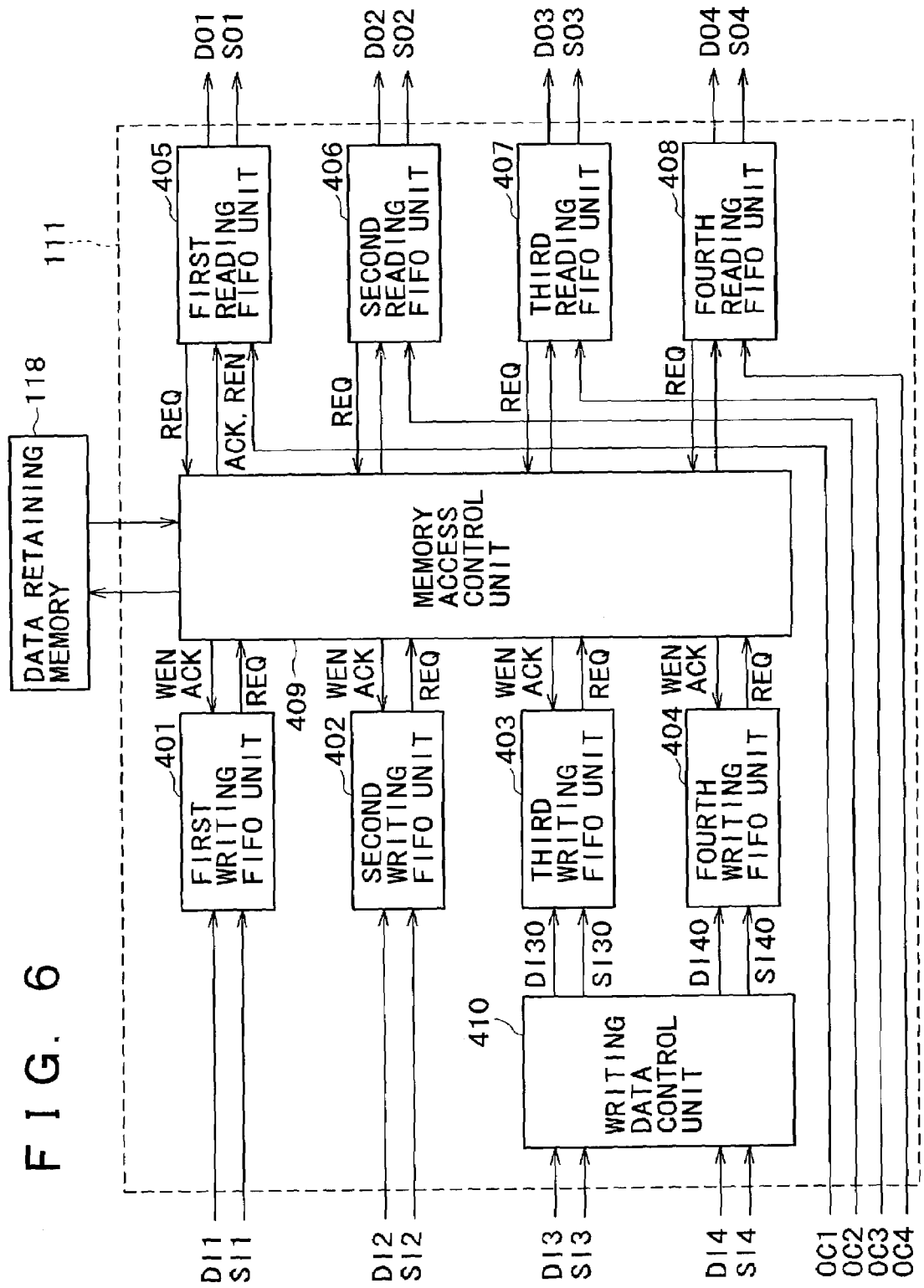
FIG. 6 is a block diagram showing a configuration of a memory control unit shown in FIG. 1.

In the following, the memory control unit 111 will be described in detail with reference to FIG. 6. As shown in FIG. 6, the memory control unit 111 includes: a memory access control unit 409; a first to a fourth writing FIFO unit 401 to 404; a first to a fourth reading FIFO unit 405 to 408; and a writing data control unit 410.

It is to be noted that while the memory control unit 111 shown in FIG. 6 includes the first to fourth writing FIFO units 401 to 404 and the first to fourth reading FIFO units 405 to 408 in correspondence with four output systems, the number of such writing and reading FIFO units is changed according to the number of systems.

The first writing FIFO unit 401 is connected to the first line number changing processing unit 107, and the second writing FIFO unit 402 is connected to the second line number changing processing unit 108. The writing data control unit 410 is connected to the third and fourth line number changing processing units 109 and 110, and the third and fourth writing FIFO units 403 and 404 are each connected to the writing data control unit 410. The first to fourth writing FIFO units 401 to 404 and the first to fourth reading FIFO units 405 to 408 are all connected to the memory access control unit 409. The memory access control unit 409 is connected to the data retaining memory 118.

The first writing FIFO unit 401 is supplied with the data DI1 and the synchronizing signal SI1 from the first line number changing processing unit 107, and the second writing FIFO unit 402 is supplied with the data DI2 and the synchronizing signal SI2 from the second line number changing processing unit 108. The writing data control unit 410 is supplied with the data DI3 and DI4 and the synchronizing signals SI3 and SI4 from the third and fourth line number changing processing units 109 and 110. The third writing FIFO unit 403 is supplied with data DI30 and a synchronizing signal SI30 from the writing data control unit 410, and the fourth writing FIFO unit 404 is supplied with data DI40 and a synchronizing signal SI40 from the writing data control unit 410.

The first to fourth writing FIFO units 401 to 404 temporarily retain the supplied data, and output a signal REQ requesting writing of the data to the data retaining memory 118 to the memory access control unit 409 when retaining a predetermined amount of data. Receiving a permission signal ACK in response to the request from the memory access control unit 409, the first to fourth writing FIFO units 401 to 404 output the data in response to a data enable signal WEN supplied from the memory access control unit 409.

On the other hand, the first to fourth reading FIFO units 405 to 408 each output a signal REQ to the memory access control unit 409 to request reading of data from the data retaining memory 118 when a predetermined space is created within. Receiving a permission signal ACK in response to the request from the memory access control unit 409, the first to fourth reading FIFO units 405 to 408 read image data retained in the data retaining memory 118 in response to a data enable signal REN supplied from the memory access control unit 409. The first to fourth reading FIFO units 405 to 408 each temporarily store the read image data therewithin.

The first to fourth reading FIFO units 405 to 408 then supply the data DO1 to DO4 and the synchronizing signals SO1 to SO4 to the first to fourth pixel number changing processing units 112 to 115 in response to the supplied synchronizing signals OC1 to OC4, respectively.

Incidentally, enabling real-time processing requires that a speed at which the first to fourth reading FIFO units 405 to 408 read data from the data retaining memory 118 and retain the data be faster than a speed at which the first to fourth reading FIFO units 405 to 408 output the data DO1 to DO4 in response to the synchronizing signals OC1 to OC4.

The memory access control unit 409 writes data to the data retaining memory 118 in response to the signal REQ supplied from the first to fourth writing FIFO units 401 to 404, and reads data from the data retaining memory 118 in response to the signal REQ supplied from the first to fourth reading FIFO units 405 to 408. In this case, the memory access control unit 409 realizes efficient access to the data retaining memory 118 by controlling the performing procedure or the like when receiving a plurality of signals REQ simultaneously.

Figure 7:
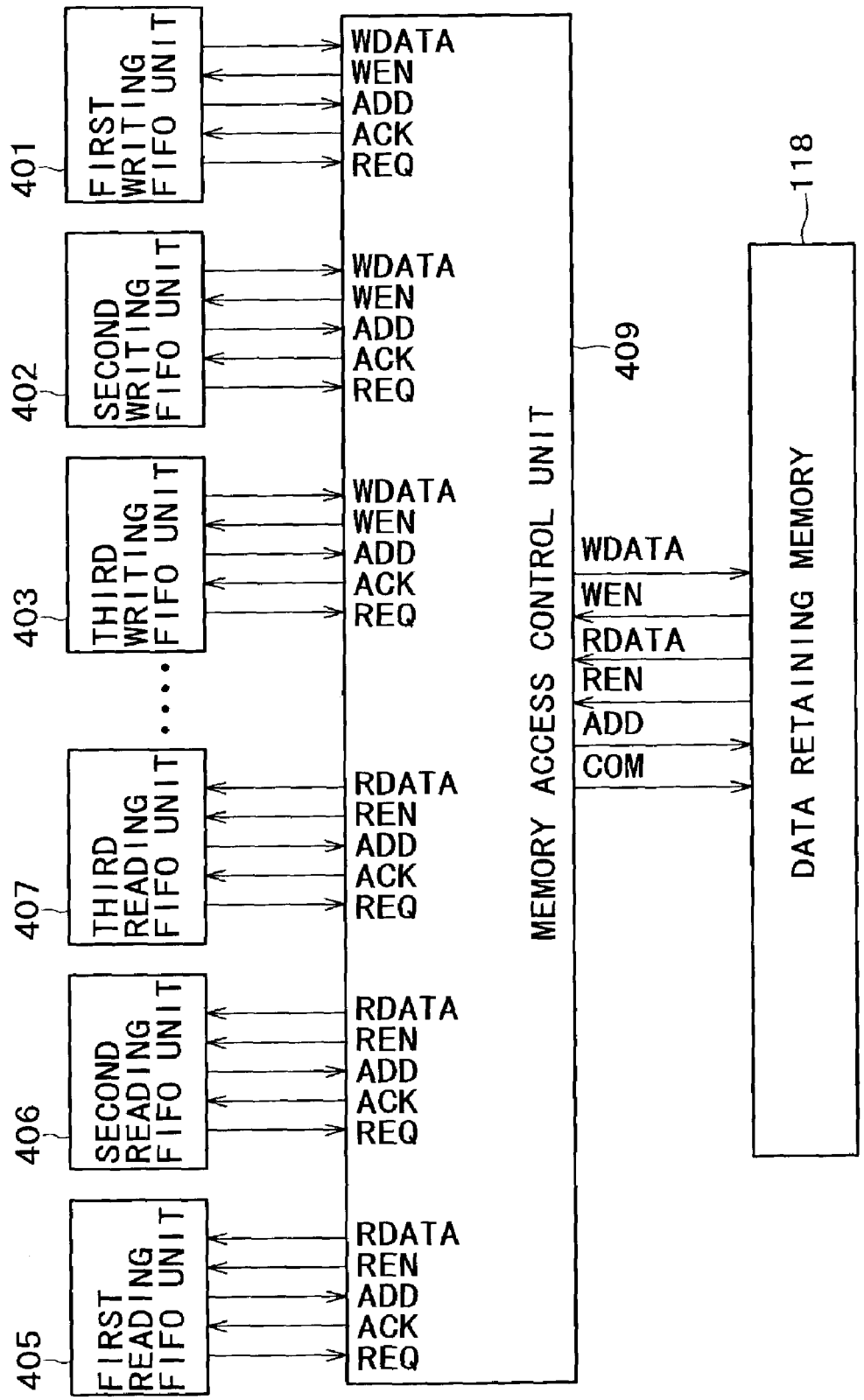
FIG. 7 is a diagram of assistance in explaining operation of a memory access control unit shown in FIG. 6.

In the following, a relation between the memory access control unit 409 and the writing or reading FIFO units will be described in detail with reference to FIG. 7. When the reading FIFO units or the writing FIFO units connected to the memory access control unit 409 are referred to as clients, the memory access control unit 409 is generally connected with n (n is a natural number) clients.

When each client is to exchange data with the data retaining memory 118, the client supplies a signal REQ and an address ADD to the memory access control unit 409. Outputting the signal REQ, the client receives a permission signal ACK from the memory access control unit 409. A reading FIFO unit reads data RDATA from the data retaining memory 118, and receives it with an enable signal REN. On the other hand, a writing FIFO unit writes data WDATA to the data retaining memory 118 in response to an enable signal WEN supplied from the memory access control unit 409.

Since as described above, each client supplies the memory access control unit 409 with an address ADD in conjunction with a signal REQ, even when a plurality of clients access the data retaining memory 118 simultaneously, the memory access control unit 409 can perform the access correctly and surely.

On the other hand, the memory access control unit 409 supplies the data retaining memory 118 with a command COM for writing or reading in conjunction with the address ADD. In reading, the memory access control unit 409 receives the data RDATA in conjunction with the enable signal REN from the data retaining memory 118. In writing, the memory access control unit 409 receives the enable signal WEN from the data retaining memory 118, and supplies the data WDATA to the data retaining memory 118.

At this time, the memory access control unit 409 needs to perform one process at a time with the data retaining memory 118. The memory access control unit 409 therefore needs to output the permission signal ACK while controlling processing requests from a plurality of clients.

Figure 8:
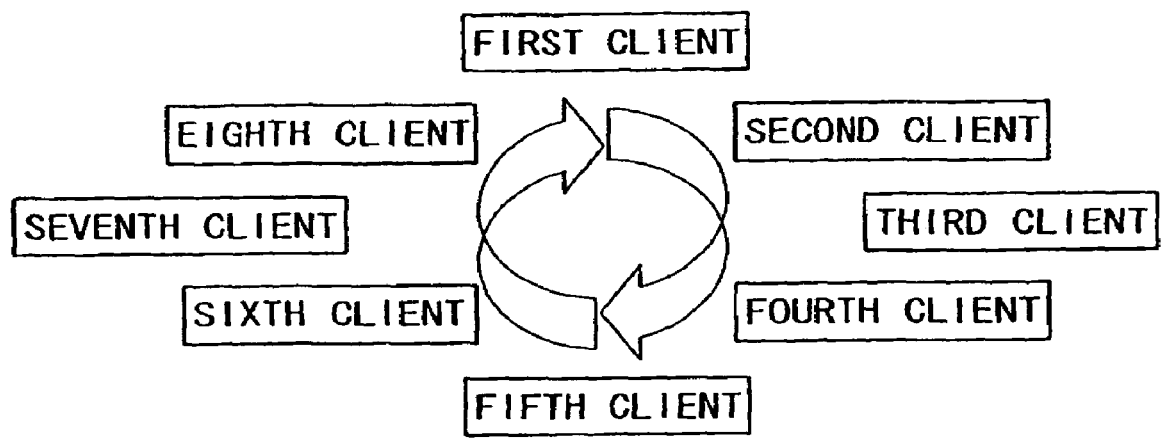
FIG. 8 is a diagram of an access control method of a conventional memory access control unit.

As shown in FIG. 8, in a case where there are eight clients, the memory access control unit 419 in the conventional image processing apparatus cyclically performs simultaneously requested processing in order of a first client to an eighth client (the processing method will hereinafter be also referred to as a "cyclic processing method"). Specifically, when receiving signals REQ from all the clients after completing processing with the second client, for example, the memory access control unit 419 performs processing with the third client, then performs processing with the fourth to eighth clients, and thereafter performs processing with the first and second clients in that order. When the requests are not made simultaneously, the processing with a client that first outputs a signal REQ to the memory access control unit 419 is performed first.

The conventional access control method has an advantage of being able to eliminate imbalance in processing between the clients and hence realize equal processing with the plurality of clients. However, because of a possibility of requiring from each client a maximum processing waiting time determined by a total number of clients, the conventional access control method is not an effective method in an image processing system in which real-time characteristics are given importance.

Figure 9:
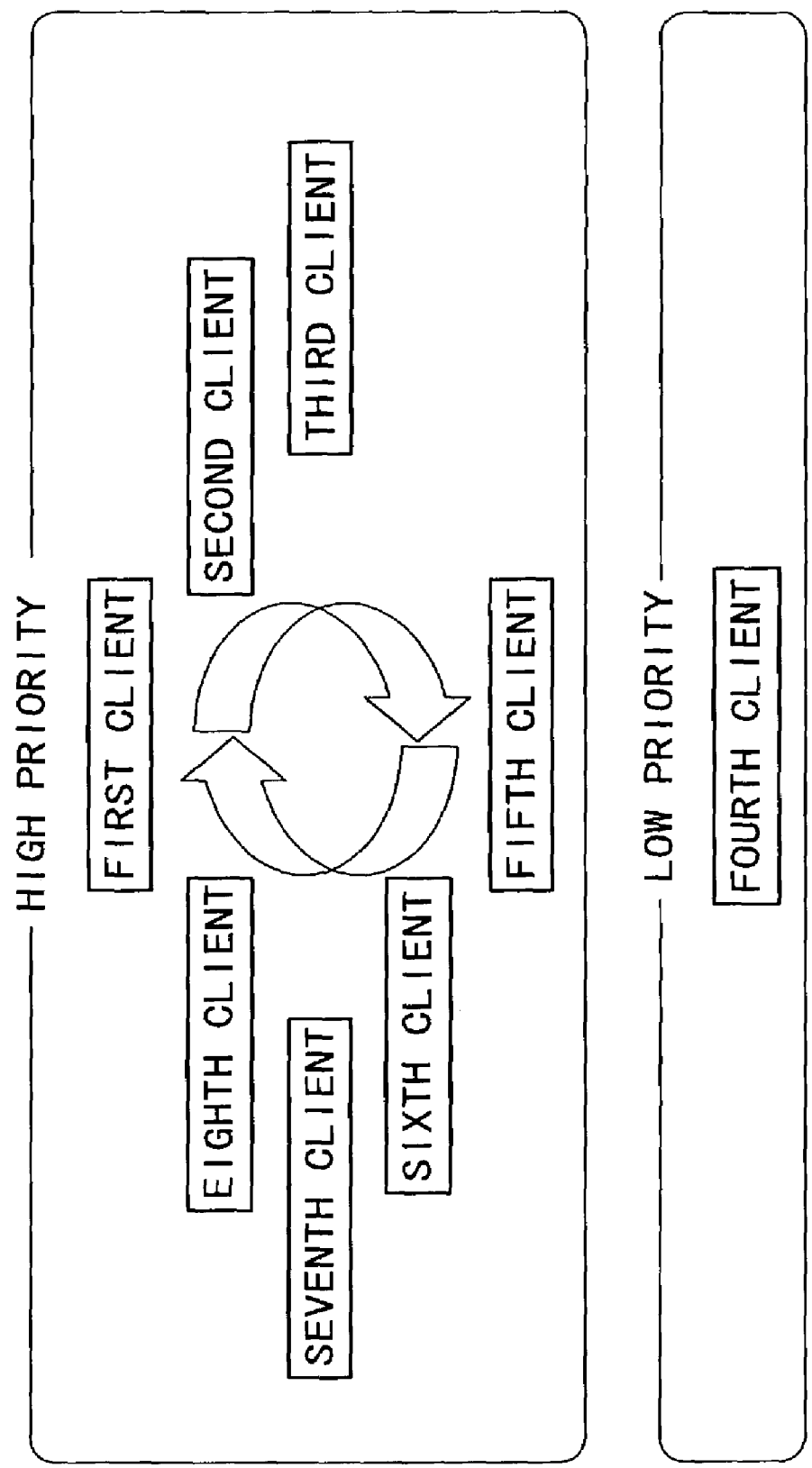
FIG. 9 is a diagram of a first example of an access control method of the memory access control unit shown in FIG. 6 and FIG. 7.
Figure 10:
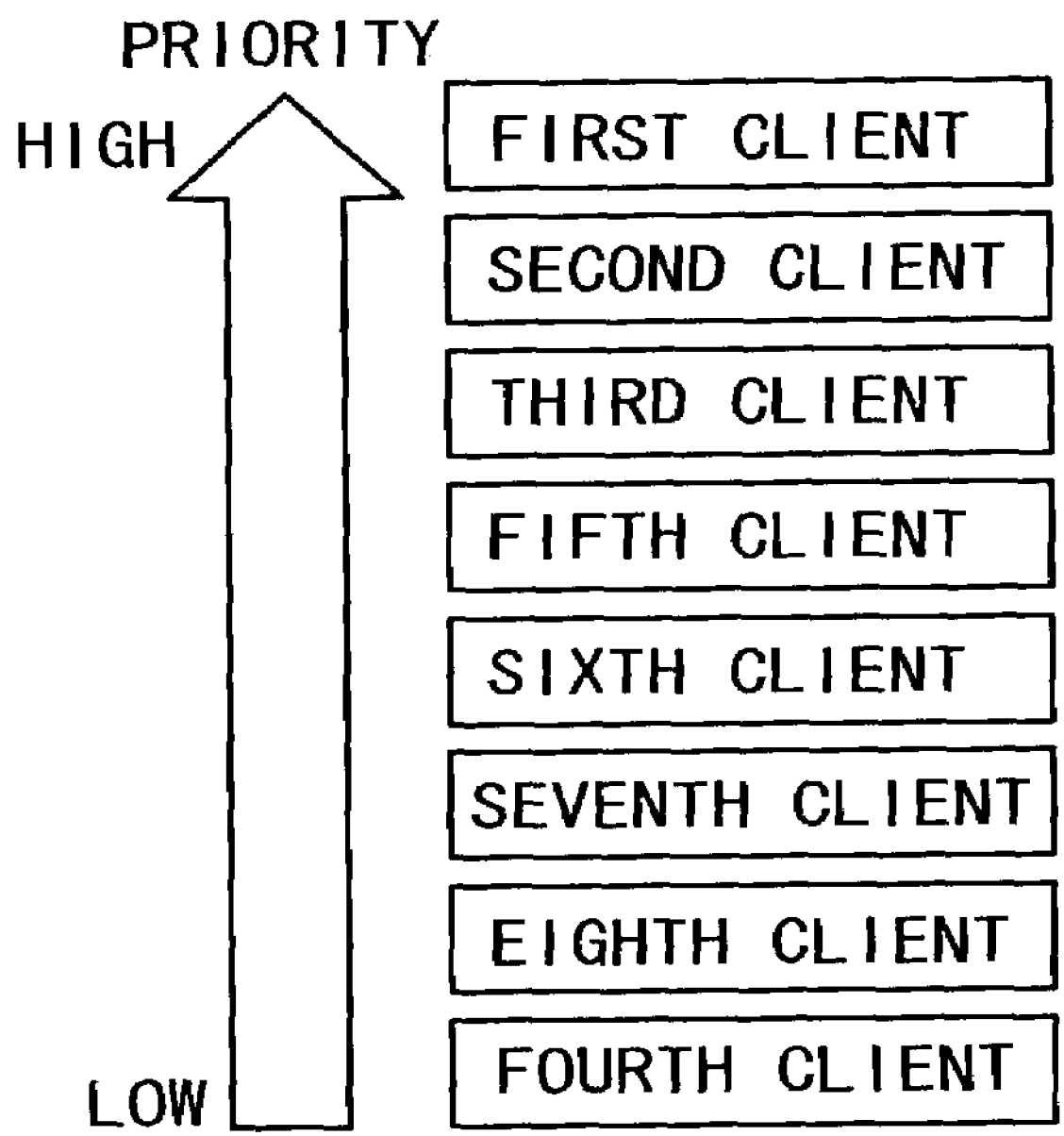
FIG. 10 is a diagram of a second example of the access control method of the memory access control unit shown in FIG. 6 and FIG. 7.

Accordingly, the memory access control unit 409 according to the embodiment of the present invention carries out an access control method illustrated in FIG. 9 or FIG. 10. Specifically, when priority of processing between the memory access control unit 409 and a fourth client is lower than priority of processing between the memory access control unit 409 and other clients, for example, a first method illustrated in FIG. 9 applies the cyclic processing method illustrated in FIG. 8 to the clients (high priority group) other than the fourth client, and performs processing between the memory access control unit 409 and the fourth client of low priority when no signal REQ is outputted from the clients of the high priority group.

With such a method, the above-mentioned maximum processing waiting time of each of the clients forming the high priority group is reduced by a time for processing between the memory access control unit 409 and the fourth client. It is therefore possible to increase speed of processing as a whole and thereby improve real time characteristics of processing in the image processing apparatus 101.

On the other hand, when similarly priority of processing between the memory access control unit 409 and a fourth client is lower than priority of processing between the memory access control unit 409 and other clients, a second method illustrated in FIG. 10 sets the priority of processing between the memory access control unit 409 and the fourth client to a lowest level, predetermines the priority of processing between the memory access control unit 409 and all the clients other than the fourth client, and then performs processing according to the priority.

Specifically, when the first client, the fifth client, and the fourth client simultaneously output a signal REQ, for example, the memory access control unit 409 first performs processing with the first client of the highest priority, and then performs processing with the fifth client. Finally, the memory access control unit 409 performs processing with the fourth client of the lowest priority.

In the image processing apparatus 101 according to the present embodiment, the fourth writing FIFO unit 404 shown in FIG. 6 corresponds to the above-mentioned fourth client of the lowest priority. Timing in which the fourth writing FIFO unit 404 outputs a signal REQ to the memory access control unit 409 is controlled by the writing data control unit 410 shown in FIG. 6. The writing data control unit 410 will hereinafter be described in detail.

The writing data control unit 410 adjusts timing in which the third writing FIFO unit 403 and the fourth writing FIFO unit 404 each output a signal REQ to the memory access control unit 409. Specifically, when the third writing FIFO unit 403 outputs a signal REQ, the writing data control unit 410 makes the fourth writing FIFO unit 404 output a signal REQ after an interval not less than a time required for data transfer between the memory access control unit 409 and one client (hereinafter also referred to as a "unit processing time").

As a result of such control, the maximum processing waiting time of the fourth writing FIFO unit 404 of the lowest priority after outputting the signal REQ to the memory access control unit 409 is controlled to seven times the unit processing time, which corresponds to the number of the other clients, and the maximum processing waiting time of the clients other than the fourth writing FIFO unit 404 is reduced to six times the unit processing time. Thus, since the processing waiting time of the plurality of clients is reduced, real-time processing in the image processing apparatus 101 is realized.

It is to be noted that while as described above, the writing data control unit 410 controls the third writing FIFO unit 403 and the fourth writing FIFO unit 404, the writing data control unit 410 may control another combination of writing FIFO units or an arbitrary combination of reading FIFO units.

In the following, operation of the memory access control unit 409 will be described in detail with reference to (a) to (x) of FIG. 11. (a) to (x) of FIG. 11 are timing charts of operation of the image processing apparatus 101 when the first to fourth writing FIFO units 401 to 404 and the first to fourth reading FIFO units 405 to 408 output a signal REQ simultaneously at a time T1.

Figure 11:
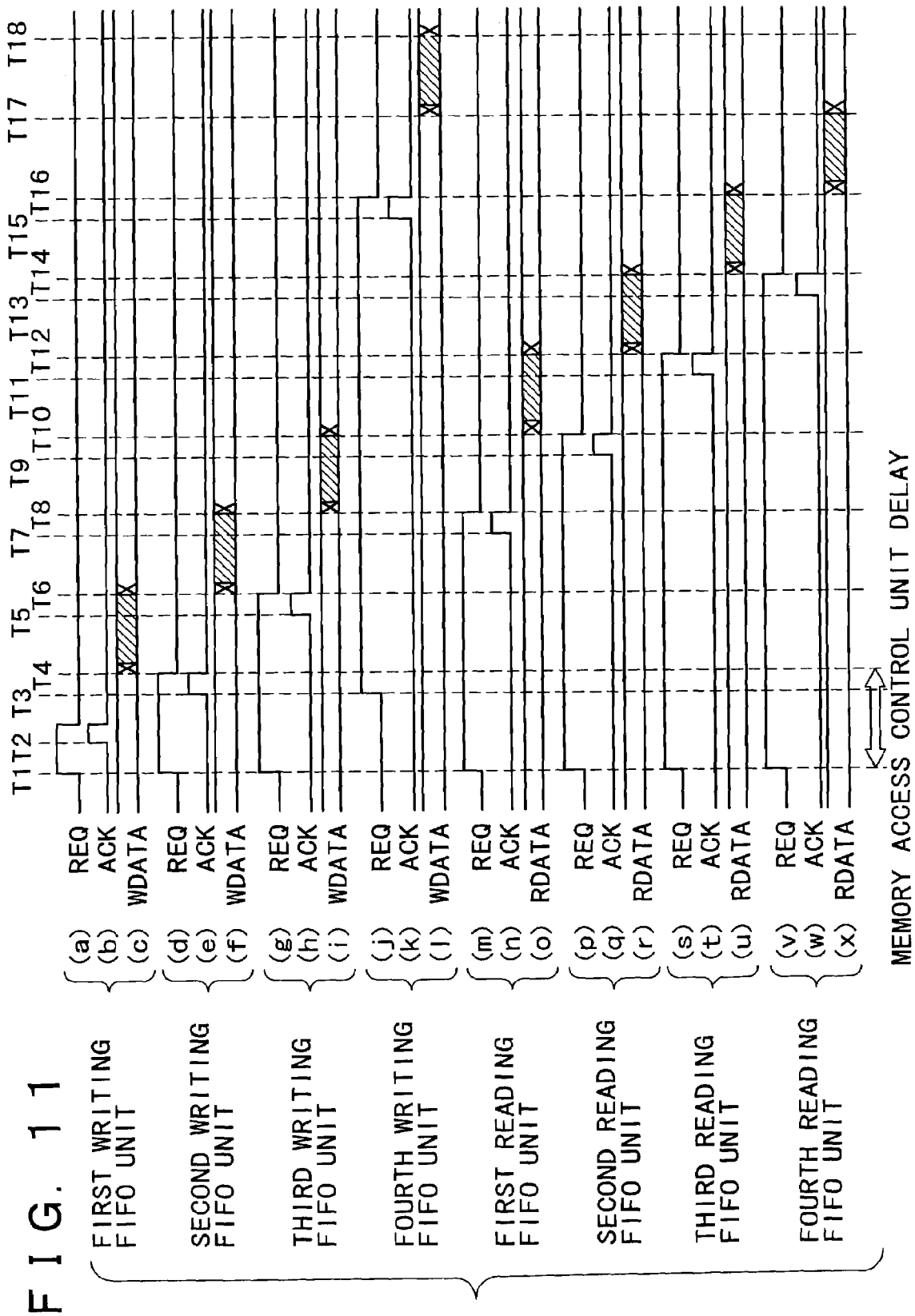
FIG. 11 is a timing chart of operation of the memory access control unit shown in FIG. 6 and FIG. 7.

As shown in (b) of FIG. 11, the memory access control unit 409 first supplies a permission signal ACK to the first writing FIFO unit 401 at a time T2. Thus, a period from the time T1 to a time T4 is a time for the memory access control unit 409 to make the data retaining memory 118 secure a memory area corresponding to an address ADD. During a period from the time T4 to a time T6, data WDATA is transferred from the first writing FIFO unit 401 to the memory access control unit 409. In this case, the period from the time T4 to the time T6 corresponds to the unit processing time.

The memory access control unit 409 supplies a permission signal ACK to the second writing FIFO unit 402 at a time T3 as shown in (e) of FIG. 11, supplies a permission signal ACK to the third writing FIFO unit 403 at a time T5 as shown in (h) of FIG. 11, supplies a permission signal ACK to the first reading FIFO unit 405 at a time T7 as shown in (n) of FIG. 11, supplies a permission signal ACK to the second reading FIFO unit 406 at a time T9 as shown in (q) of FIG. 11, supplies a permission signal ACK to the third reading FIFO unit 407 at a time T11 as shown in (t) of FIG. 11, and supplies a permission signal ACK to the fourth reading FIFO unit 408 at a time T13 as shown in (w) of FIG. 11.

Thereby, as shown in (f) of FIG. 11, the second writing FIFO unit 402 transfers data WDATA to the memory access control unit 409 during a period from the time T6 to a time T8. As shown in (i) of FIG. 11, the third writing FIFO unit 403 transfers data WDATA to the memory access control unit 409 during a period from the time T8 to a time T10.

As shown in (o) of FIG. 11, data RDATA is transferred from the memory access control unit 409 to the first reading FIFO unit 405 during a period from the time T10 to a time T12. As shown in (r) of FIG. 11, data RDATA is transferred from the memory access control unit 409 to the second reading FIFO unit 406 during a period from the time T12 to a time T14. In this case, the period from the time T10 to the time T12 and the period from the time T12 to the time T14 each correspond to the unit processing time.

Further, as shown in (u) of FIG. 11, data RDATA is transferred from the memory access control unit 409 to the third reading FIFO unit 407 during a period from the time T14 to a time T16. As shown in (x) of FIG. 11, data RDATA is transferred from the memory access control unit 409 to the fourth reading FIFO unit 408 during a period from the time T16 to a time T17.

On the other hand, even when the fourth writing FIFO unit 404 is to output a signal REQ at the time T1, the writing data control unit 410 delays timing of the output until the time T3 as shown in (j) of FIG. 11. As shown in (k) of FIG. 11, the fourth writing FIFO unit 404 receives a permission signal ACK from the memory access control unit 409 at a time T15. As shown in (l) of FIG. 11, the fourth writing FIFO unit 404 transfers data WDATA to the memory access control unit 409 during a period from the time T17 to a time T18.

Thus, letting $\alpha$ be the period from the time T1 to the time T4 and C be the unit processing time, the processing waiting time of the first writing FIFO unit 401 is $\alpha$; the processing waiting time of the second writing FIFO unit 402 is $(\alpha+C)$; the processing waiting time of the third writing FIFO unit 403 is $(\alpha+2C)$; and the processing waiting time of the first reading FIFO unit 405 is $(\alpha+3C)$. The processing waiting time of the second reading FIFO unit 406 is $(\alpha+4C)$; the processing waiting time of the third reading FIFO unit 407 is $(\alpha+5C)$; and the processing waiting time of the fourth reading FIFO unit 408 is $(\alpha+6C)$.

Since the output of the signal REQ by the fourth writing FIFO unit 404 is delayed until the time T3 by the writing data control unit 410, when a period from the time T3 to the time T6 is equal to the $\alpha$, the processing waiting time of the fourth writing FIFO unit 404 is $(\alpha+6C)$.

For comparison, operation of the conventional memory access control unit 419 when the first to fourth writing FIFO units 401 to 404 and the first to fourth reading FIFO units 405 to 408 output a signal REQ simultaneously at a time T1 will be described with reference to timing charts of (a) to (x) of FIG. 12.

As shown in (b) of FIG. 12, the memory access control unit 419 first supplies a permission signal ACK to the first writing FIFO unit 401 at a time T2. Thus, during a period from a time T4 to a time T6, data WDATA is transferred from the first writing FIFO unit 401 to the memory access control unit 419. In this case, the period from the time T4 to the time T6 corresponds to the unit processing time.

The memory access control unit 419 supplies a permission signal ACK to the second writing FIFO unit 402 at a time T3 as shown in (e) of FIG. 12, supplies a permission signal ACK to the third writing FIFO unit 403 at a time T5 as shown in (h) of FIG. 12, supplies a permission signal ACK to the fourth writing FIFO unit 404 at a time T7 as shown in FIG. 12K, supplies a permission signal ACK to the first reading FIFO unit 405 at a time T9 as shown in (n) of FIG. 12, supplies a permission signal ACK to the second reading FIFO unit 406 at a time T11 as shown in (q) of FIG. 12, supplies a permission signal ACK to the third reading FIFO unit 407 at a time T13 as shown in (t) of FIG. 12, and supplies a permission signal ACK to the fourth reading FIFO unit 408 at a time T15 as shown in (w) of FIG. 12.

Thereby, as shown in (f) of FIG. 12, the second writing FIFO unit 402 transfers data WDATA to the memory access control unit 419 during a period from the time T6 to a time T8. As shown in (i) of FIG. 12, the third writing FIFO unit 403 transfers data WDATA to the memory access control unit 419 during a period from the time T8 to a time T10. As shown in (l) of FIG. 12, the four(r)th writing FIFO unit 404 transfers data WDATA to the memory access control unit 419 during a period from the time T10 to a time T12.

As shown in (o) of FIG. 12, data RDATA is transferred from the memory access control unit 419 to the first reading FIFO unit 405 during a period from the time T12 to a time T14. As shown in (r) of FIG. 12, data RDATA is transferred from the memory access control unit 419 to the second reading FIFO unit 406 during a period from the time T14 to a time T16. In this case, the period from the time T12 to the time T14 and the period from the time T14 to the time T16 each correspond to the unit processing time.

Further, as shown in (u) of FIG. 12 data RDATA is transferred from the memory access control unit 419 to the third reading FIFO unit 407 during a period from the time T16 to a time T17. As shown in (x) of FIG. 12, data RDATA is transferred from the memory access control unit 419 to the fourth reading FIFO unit 408 during a period from the time T17 to a time T18.

Thus, letting $\alpha$ be the period from the time T1 to the time T4 and C be the unit processing time, the processing waiting time of the first writing FIFO unit 401 is $\alpha$; the processing waiting time of the second writing FIFO unit 402 is $(\alpha+C)$; the processing waiting time of the third writing FIFO unit 403 is $(\alpha+2C)$; the processing waiting time of the fourth writing FIFO unit 404 is $(\alpha+3C)$; and the processing waiting time of the first reading FIFO unit 405 is $(\alpha+4C)$. The processing waiting time of the second reading FIFO unit 406 is $(\alpha+5C)$; the processing waiting time of the third reading FIFO unit 407 is $(\alpha+6C)$; and the processing waiting time of the fourth reading FIFO unit 408 is $(\alpha+7C)$.

Hence, the conventional memory access control unit 419 shown in FIG. 16 requires a maximum processing waiting time of $(\alpha+7C)$. On the other hand, the image processing apparatus 101 according to the present embodiment as shown in FIG. 1 can reduce the maximum processing waiting time by the unit processing time C to $(\alpha+6C)$, thus realizing real-time processing.

The first to fourth pixel number changing processing units 112 to 115 generate an output image by subjecting pixels forming the image to interpolating calculation. Incidentally, the interpolating function may be implemented by hardware or by software. Also, any method may be used for the interpolating calculation.

More specifically, the first pixel number changing processing unit 112 outputs the output image 202 as the first output data; the second pixel number changing processing unit 113 outputs the output image 203 as the second output data; the third pixel number changing processing unit 114 outputs the output image 204 as the third output data; and the fourth pixel number changing processing unit 115 outputs the output image 205 as the fourth output data.

The output synchronizing signal generating unit 116 generates synchronizing signals OC1 to OC4 in response to the input synchronizing signal supplied thereto, and then supplies the synchronizing signals OC1 to OC4 to the first to fourth reading FIFO units 405 to 408, respectively. In the above concrete example, the number of frames within a predetermined time is unchanged between the input synchronizing signal and the first to fourth output synchronizing signals. Therefore the synchronizing signals OC1 to OC4 are generated using the field synchronizing signal Vsi shown in FIG. 3(a) as a trigger.

The data retaining memory 118 retains image data supplied from the memory control unit 111. While the data retaining memory 118 can be formed by a memory as hardware, the data retaining memory 118 may be formed by software as an array area allocated in a memory of a CPU. The data retaining memory 118 has a function as a FIFO for writing and reading image data according to requests from the memory control unit 111. Specifically, the data retaining memory 118 retains data processed by the first to fourth line number changing processing units 107 to 110, and outputs data DO1 to DO4 to the first to fourth pixel number changing processing units 112 to 115, respectively.

Incidentally, the memory control unit 111 controls the reading of data from the data retaining memory 118 such that the data DO1 to DO4 being read does not pass the written data DI1 to DI4 and a data amount of the written data DI1 to DI4 does not exceed a capacity of the data retaining memory 118.

The image processing apparatus 101 according to the present embodiment performs image processing for the four systems in parallel, and the data retaining memory 118 is shared in the parallel processing. The capacity of the data retaining memory 118 is sufficiently large to output the data DO1 to DO4 from the first to fourth reading FIFO units 405 to 408 in real time.

In the following, operation of the image processing apparatus 101 will be described. FIG. 13(a) and FIG. 13(b) show the field synchronizing signal Vsi and the horizontal synchronizing signal Hsi, respectively, inputted to the image processing apparatus 101, and FIG. 13C shows the input data inputted to the image processing apparatus 101. Incidentally, the signals shown in FIGS. 13(a) to 13(c) are the same as the signals shown in FIGS. 3(a) to 3(c).

FIG. 14(a) and FIG. 14(b) show the field synchronizing signal Vsi and the horizontal synchronizing signal Hsi forming the synchronizing signals SI1 to SI4 outputted from the first to fourth line number changing processing units 107 to 110. FIG. 14(c) shows the data DI1 outputted from the first line number changing processing unit 107. FIG. 14(d) shows the data DI2 outputted from the second line number changing processing unit 108. FIG. 14(e) shows the data DI3 outputted from the third line number changing processing unit 109. FIG. 14(f) shows the data DI4 outputted from the fourth line number changing processing unit 110.

In the above concrete example, the first line number changing processing unit 107 converts 540 lines of one field into 480 lines. Hence, as shown in FIG. 13(C) and FIG. 14(c), part of image data is eliminated in the conversion. The second line number changing processing unit 108 converts 540 lines of one field into 360 lines, as described above. Hence, as shown in FIG. 14(d), the data DI2 even smaller in data amount than the data DI1 is generated.

Similarly, the third line number changing processing unit 109 converts 540 lines of one field into 240 lines. Hence, as shown in FIG. 14(e), the data DI3 even smaller in data amount than the data DI2 is generated. The fourth line number changing processing unit 110 converts 540 lines of one field into 180 lines. Hence, as shown in FIG. 14(f), the data DI4 even smaller in data amount than the data DI3 is generated.

Incidentally, as shown in FIGS. 13(a) and 13(b) and FIGS. 14(a) and 14(b), the synchronizing signals SI1 to SI4 are the same as the input synchronizing signal.

FIG. 15(a) and FIG. 15(b) show the field synchronizing signal Vso1 and the horizontal synchronizing signal Hso1, respectively, forming the first output synchronizing signal outputted from the first pixel number changing processing unit 112. FIG. 15(c) shows the first output data outputted from the first pixel number changing processing unit 112. FIG. 15(d) shows the second output data outputted from the second pixel number changing processing unit 113. FIG. 15(e) and FIG. 15(f) show the field synchronizing signal Vso3 and the horizontal synchronizing signal Hso3, respectively, forming the third output synchronizing signal outputted from the third pixel number changing processing unit 114. FIG. 15(g) shows the third output data outputted from the third pixel number changing processing unit 114. FIG. 15(h) shows the fourth output data outputted from the fourth pixel number changing processing unit 115.

As shown in FIGS. 15(a) to 15(h), when the first and second pixel number changing processing units 112 and 113 each output image data for 60 lines, for example, in a period from a time T1 to a time T2, the third and fourth pixel number changing processing units 114 and 115 each output image data for 30 lines.

As described above, with the image processing apparatus 101 according to the embodiment of the present invention, in generating a plurality of different image formats from one piece of input image data and outputting the plurality of different image formats in real time, it is possible to increase the speed of reading and writing data from and to the data retaining memory 118, and further it is possible to reduce a memory capacity required of the data retaining memory 118 and thereby reduce manufacturing cost as compared with the conventional image processing apparatus.

It is to be noted that the present invention can also be realized by software executed by a CPU instead of the hardware shown in FIG. 1.

While a preferred embodiment of the present invention has been described using specific terms, such description is for illustrative purposes only, and it is to be understood that changes and variations may be made without departing from the spirit or scope of the following claims.

What is claimed is:

1. An image processing apparatus comprising:
   storing means for storing image data supplied thereto;
   a plurality of data retaining means for temporarily retaining said image data to write to and read from said storing means;
   memory access means for performing access to said storing means, said access being requested by said plurality of data retaining means; and
   access timing control means for shifting, at all times by a predetermined time, timing of said request made by at least one of said data retaining means to said memory access means in comparison with timing of said request made by the other said data retaining means to said memory access means,
      wherein said comparison occurs substantially simultaneously between first-in-first-out units of said memory access means.

2. An image processing apparatus as claimed in claim 1, further comprising:
   first data processing means for performing first processing of image data supplied thereto; and
   second data processing means for performing second processing of image data read from said storing means;
      wherein said plurality of data retaining means each include:
         writing data retaining means for temporarily retaining said image data to write the image data processed by said first data processing means to said storing means; and reading data retaining means for temporarily retaining the image data read from said storing means to supply the image data to said second data processing means.

3. An image processing apparatus as claimed in claim 2, wherein said first data processing means converts the number of lines of the image data supplied thereto; and said second data processing means converts the number of pixels of the image data supplied thereto.

4. An image processing apparatus as claimed in claim 1, wherein said predetermined time is not less than a time from said request to said memory access means by either one of said data retaining means to completion of data transfer between said data retaining means and said memory access means, said data transfer being performed in response to said request.

5. An image processing method using an image processing apparatus, said image processing apparatus including: storing means for storing image data supplied thereto; a plurality of data retaining means for temporarily retaining said image data to write to and read from said storing means; and memory access means for performing access to said storing means, said access being requested by said plurality of data retaining means, said image processing method comprising:
a step for shifting, at all times by a predetermined time, timing of said request made by at least one of said data retaining means to said memory access means in comparison with timing of said request made by the other said data retaining means to said memory access means,
wherein said comparison occurs substantially simultaneously between first-in-first-out units of said memory access means.

6. An image processing method as claimed in claim 5, further comprising:
a first processing step for performing first processing of supplied image data; and
a second processing step for performing second processing of image data read from said storing means;
wherein said plurality of data retaining means each include:
writing data retaining means for temporarily retaining said image data to write the image data processed in said first processing step to said storing means; and
reading data retaining means for temporarily retaining the image data read from said storing means to subject the image data to said second processing in said second processing step.

7. An image processing method as claimed in claim 6, wherein, in said first processing step, the number of lines of the supplied image data is converted; and
in said second processing step, the number of pixels of the supplied image data is convened.

8. An image processing method as claimed in claim 5, wherein said predetermined time is not less than a time from said request to said memory access means by either one of said data retaining means to completion of data transfer between said data retaining means and said memory access means, said data transfer being performed in response to said request.

* * * * *